Feb. 21, 1967  K. B. BREDTSCHNEIDER  3,305,208
SEGMENTAL VALVE STEM CONNECTION
Filed Dec. 26, 1963  2 Sheets-Sheet 1
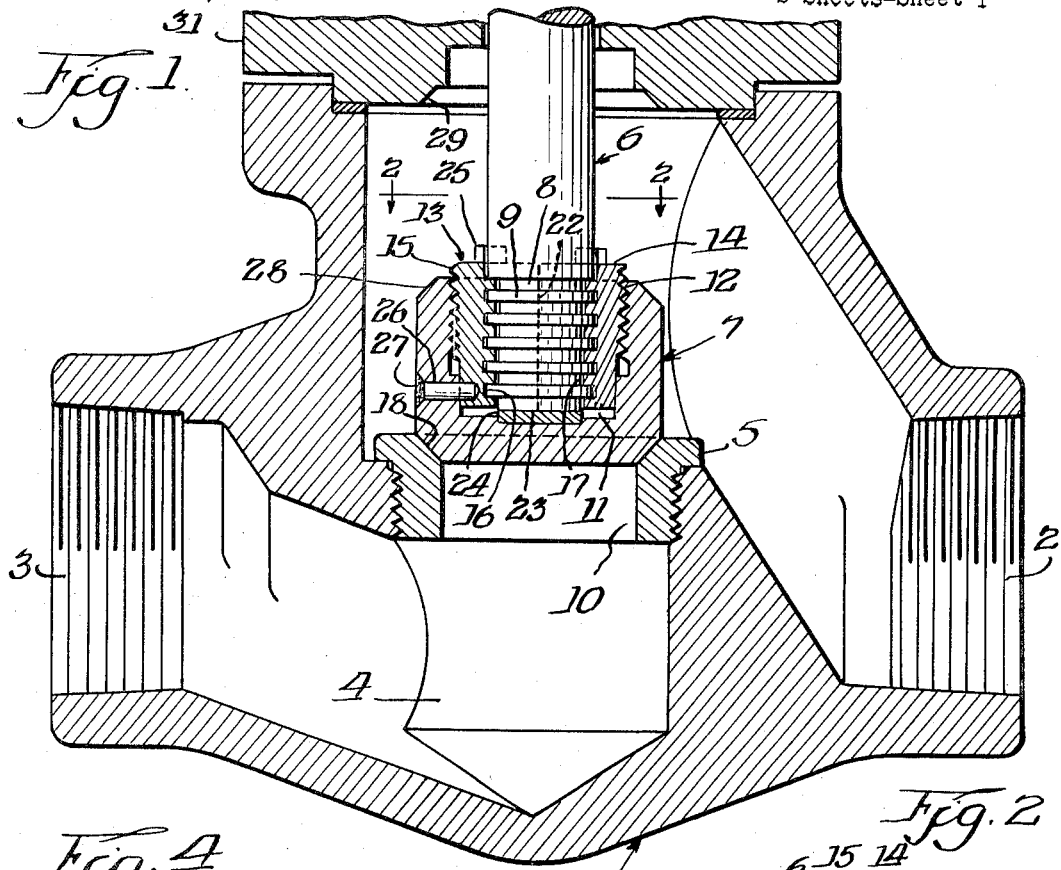
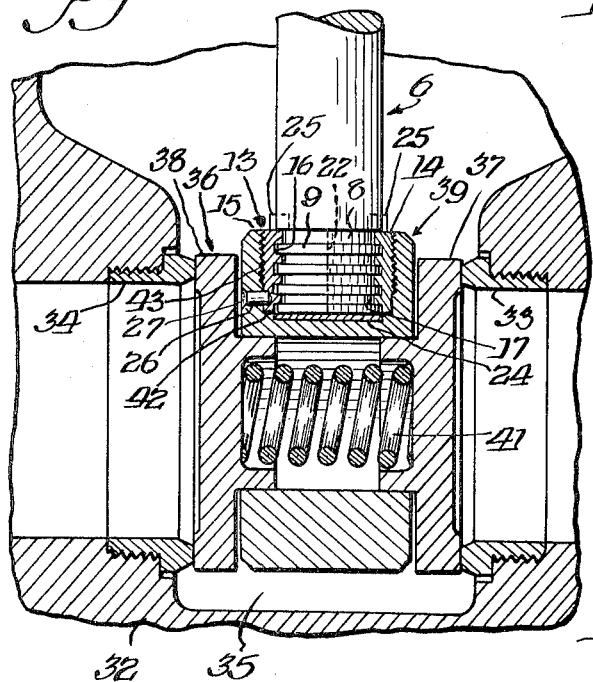
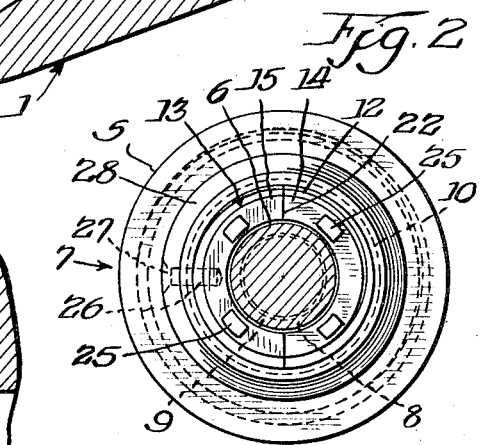
Inventor.
Kurt B. Bredtschneider.
By Joseph O. Lange
Atty.

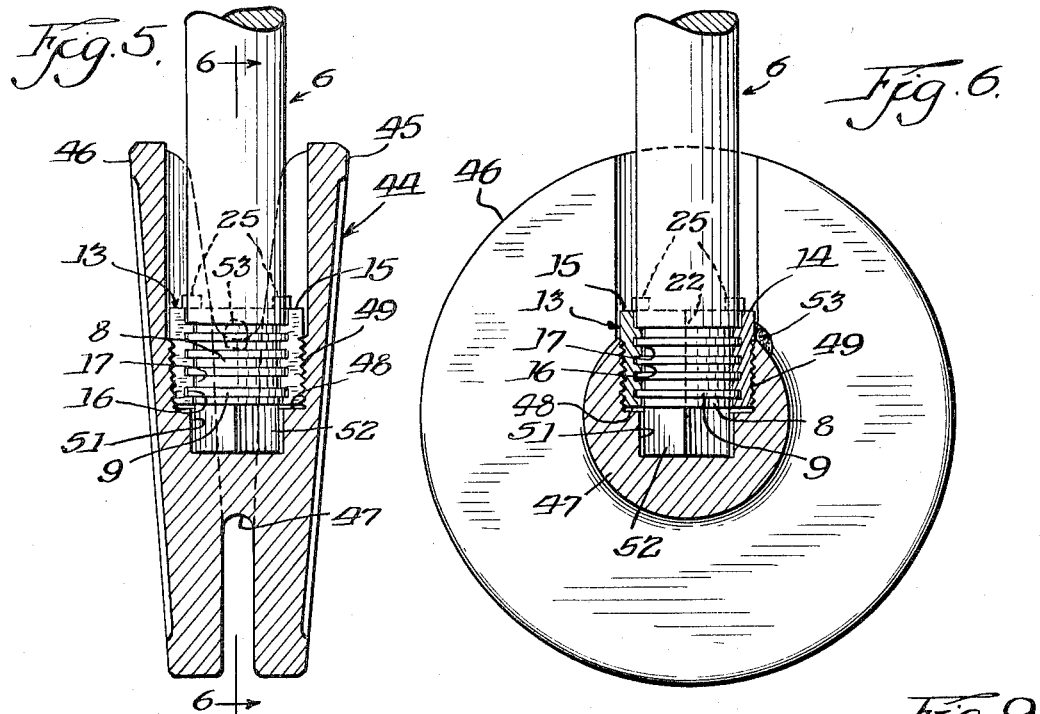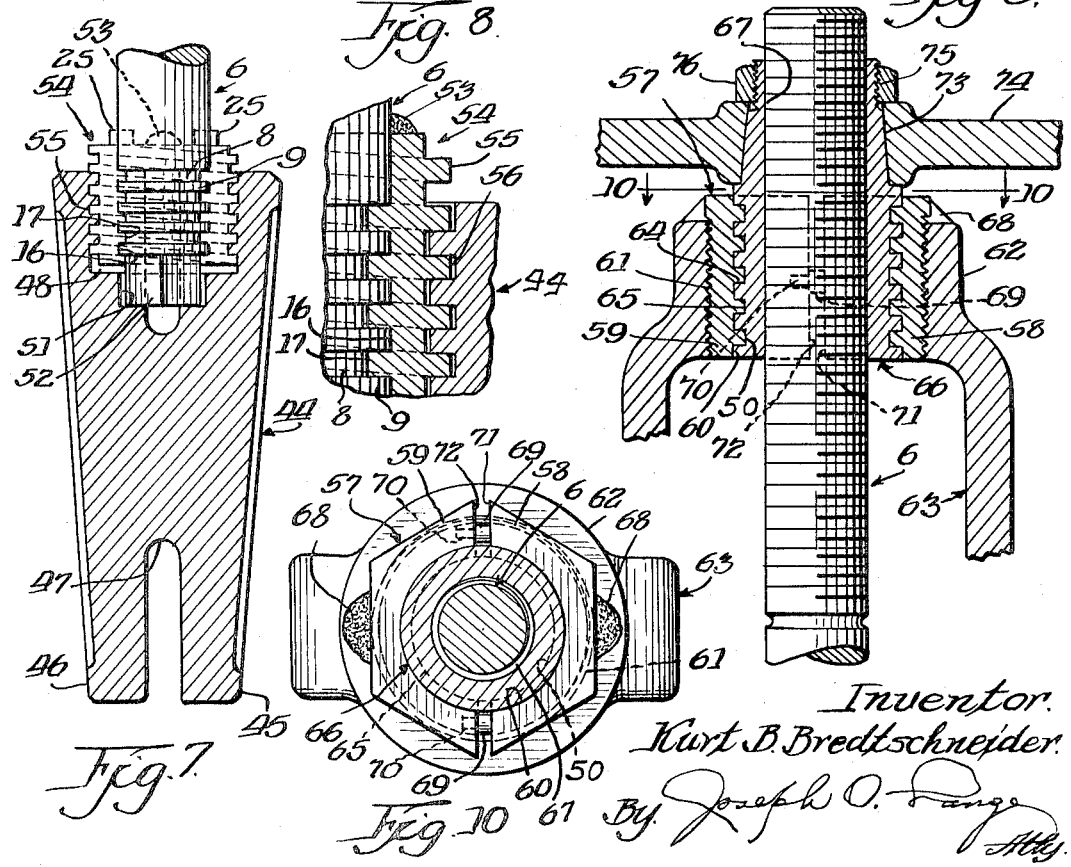

United States Patent Office 3,305,208
Patented Feb. 21, 1967

3,305,208
SEGMENTAL VALVE STEM CONNECTION
Kurt B. Bredtschneider, Chicago, Ill., assignor to Crane Co., Chicago, Ill., a corporation of Illinois
Filed Dec. 26, 1963, Ser. No. 333,398
10 Claims. (Cl. 251—88)

This invention relates generally to valves, and, more particularly, it is concerned with connecting means between certain parts or members associated with valves such as the connection between the valve stem and the valve closure member and also between the split ring nut or annular segments and the yoke sleeve in the journalling of a valve stem or the like.

In order to acquire a better appreciation of the value of this contribution to the valve industry, it should be understood at the outset that heretofore one of the major problems facing valve manufacturers has been the need for a sturdy and economical connection of the character hereinabove referred to. The constructions of this invention replace current designs which have demonstrated weaknesses and also objections from both cost and replacement viewpoints. In connection with considering the economy of the instant invention over the prior art, it must be appreciated that in prior valve constructions involving connections between the stem and the closure member a usual form resided in making the valve stem with a T-head at said connection between the stem and the closure member.

The provision for said T-head has necessarily required more expensive constructions in a valve stem, as, for example, machining or forging of the valve stem to form the head, together with the attendant heat treatments required in order to relieve internal stresses.

Therefore, it is one of the more important objects of this invention to provide for a valve stem connection of the general character hereinafter described in which no restriction on the selection of the stem material is imposed and therefore plain bar stock material can easily be used without heat treatment and with minimum fabrication costs involved.

Accordingly, it is one of the more important objects of this invention to overcome these prior restrictions and to provide an improved type of construction in a more economical and trouble-free manner with a widespread selection of materials being available.

Other objects and advantages will become more readily apparent upon proceeding with the following description read in light of the accompanying drawings, in which:

FIG. 1 is a fragmentary sectional assembly view of a valve embodying the construction of this invention;

FIG. 2 is a fragmentary transverse sectional assembly view taken on the line 2—2 of FIG. 1;

FIG. 3 is a magnified fragmentary sectional view to illustrate more clearly certain advantages herein referred to more specifically;

FIG. 4 is a fragmentary sectional assembly view of a double disc spring-loaded parallel seated gate valve embodying my invention;

FIG. 5 is a fragmentary sectional assembly view of a valve disc and stem connection applied to a flexible gate construction;

FIG. 6 is a fragmentary sectional assembly view taken on the line 6—6 of FIG. 5;

FIG. 7 is a fragmentary sectional assembly view of the invention applied to a flexible disc or gate modified from the construction shown in FIG. 5;

FIG. 8 is a fragmentary magnified view of the construction shown in FIG. 7;

FIG. 9 is a fragmentary sectional view of modified form of the invention applied to a connection between a yoke sleeve stem and the split ring nut or annular segments of this invention for the purpose of providing stem journalling means to a valve yoke; and FIG. 10 is a fragmentary sectional view taken on the line 10—10 of FIG. 9.

Similar reference numerals refer to similar parts throughout the several views.

Referring now to FIG. 1 for purpose of illustration, a globe valve with a casing generally designated 1 is shown having the usual end connections 2 and 3 for attachment to a pipe line (not shown), the valve casing being provided with the central valve chamber 4 having at an upper end portion thereof a valve seat ring 5, although the latter ring may be dispensed with and the seat itself may be made integrally with the valve casing without affecting the application of this invention.

A reciprocally movable valve stem 6 is provided with the novel connection forming the subject matter of this invention for attachment of the stem 6 to the closure or base member 7. At a lower end portion of the stem 6, a plurality of concentric grooves 8 and complementary annular projections or tongues 9 are provided as indicated, the said grooves and the annular projections being concentric and thereby extending in common planes as shown. The number of grooves and the number of annular projections will obviously vary with the axial length of the connection desired between the stem 6 and the closure member 7 so as to keep the unit load on the grooves and projections to a desirable minimum. The seat opening of the valve is defined by the numeral 10. The interior of the closure member 7 is provided with an inner chamber 11, which at an upper portion thereof, as indicated, is provided with the threads 12. The function of said threads is to receive a split disc stem ring nut or bushing generally designated 13, which, in this case, as shown more clearly in FIG. 2, is made in two halves or segments 14 and 15 which are provided with the inner annular grooves 16 and the inner annular projections or tongues 17. The latter annular grooves and projections coincide in number and approximate dimensions with the respective grooves and projections 8 and 9 as described for the valve stem 6.

As shown more clearly in FIG. 3, in order to allow for any possible misalignment in the matter of seating the closure member 7 with relation to its seat 18 the annular clearances indicated at 19 and 21 are provided between the annular projections 9 and the grooves 8 of the stem 6 and complementary grooves and projections of the disc stem ring 13. It will be appreciated that the disc stem ring nut 13 being formed of the two halves or segments 14 and 15 is assembled in close abutting relation as indicated at 22. In order to assemble the member 13 within the threads 12, the stem is held in the position shown with the end portion thereof as at 23 abutting the thrust washer 24. With the stem in said position, the spaced apart lugs 25 are gripped by any suitable tool such as a spanner wrench and then the said halves 14 and 15 are rotated so as to move axially inwardly into the closure member chamber 11. Such rotative movement is continued until the threads provide the desired grip of the respective annular projections 9 and 17 to hold the stem axially relative to the closure member 7 upon ascertaining a satisfactory rotative or swivelling condition for the latter member.

The lock pin 26 is preferably applied in position so as to engage one of the half portions 14 or 15 of the disc stem ring nut 13 as more clearly shown in FIG. 2. The pin may be suitably sealed against accidental withdrawal or loss by means of a weld 27.

Thus, it should now be clear that a relatively simple and easily assembled swivel connection has been provided between the closure member and the stem employing a unique split disc stem ring nut or segments having a desirable low unit load between the respective grooves and projections referred to in both the opening and closing movements of the valve. The valve closure member by means of its annular backseating surface 28 contacts the similar surface 29 of the bonnet 31 when the valve is in the wide open position as distinguished from the closed position illustrated in FIG. 1.

Referring now to a modification of this invention, as shown in FIG. 4, a gate valve body 32 is provided having the usual seat rings 33 and 34 in spaced-apart relation defining the outer end limits of the valve chamber 35 and serving as the means for fluid sealing contact for a double disc gate valve closure member generally designated 36. Said closure member has spaced parallel contact faces formed by the respective seat contact members 37 and 38. These members have inner end portions rotatably engaging the disc carrier 39 and have interposed therebetween a coil spring 41 for the purpose of applying seating loads between the disc halves 37 and 38 and the respective seat rings 33 and 34 as shown. In the instant modification, the disc carrier generally designated 39 is provided with a chamber 42 threaded as at 43 to receive the split disc stem ring nut or segments generally designated 13 and consisting of the halves 14 and 15. A thrust washer member 24 is employed in the same manner as previously described in connection with FIG. 1. The lugs 25 are used in the same manner in mounting and securing the valve stem 6 in suitable rotatable relation to the carrier 39 as previously described in connection with the closure member of FIG. 1. A pin 26 locks the assembly in position and is weld sealed at 27 also in the manner previously described. Thus, it will be apparent that in this construction, the connection between the split disc stem ring and the stem 6 with the disc carrier 39 similarly is accomplished in the durable and economical manner as described in connection with FIGS. 1 to 3 inclusive.

In a further modification, attention is now directed to FIGS. 5 and 6 in which a flexible wedge gate valve closure member generally designated 44 is provided with the respective disc half portions 45 and 46 connected at a central portion thereof by means of an integral tie or strut 47. In this construction, however, the stem 6 is of a non-rotatable type and engages the disc chamber 48 threadedly defined at 49 to receive the split disc stem ring nut 13 consisting of the halves or annular segments 14 and 15. As previously stated, the stem 6 is non-rotatably mounted in relation to the closure member disc or gate 44 and to positively assure of such non-rotatability the strut 47 is polygonally hollow as at 51 to receive the square end portion 52 of the valve stem 6. Also in the same manner as previously described in connection with FIGS. 1 to 4 inclusive, the split disc stem ring nut halves are provided with the usual concentric grooves 16 and the inner annular projections 17 as described in connection with the previous figures. The stem also has the annular grooves and the projections 8 and 9 respectively cooperating therewith. In effecting the assembly of the non-rotatable stem 6 with the closure member 44, this is accomplished by rotating the split ring portions 14 and 15 together within the threaded chamber 48 as previously described.

After the assembly of the stem and closure member is completed, the lock weld 53 is applied between the segments of the disc stem ring nut 13 and the integral strut 47, as shown more clearly in FIG. 6. It will be understood that the usual guides between the disc or gate closure member and the valve body are not shown, since the assembly constituting these figures is viewed as being outside of a valve body or casing. The versatility of the use of the split disc stem ring nut or annularly disposed segments in relation to a flexible disc gate valve is thus clearly illustrated and sets forth the beneficial manner in which the connecting tie means or strut 47 of the closure member also serves as the basis for making the disc stem connection conveniently and in a relatively economical manner.

Referring to a further modification, attention is now directed to FIGS. 7 and 8 illustrating the manner in which the disc-stem connection employs segments comprising the split disc stem ring nut 54. However, instead of employing the V-threads 49 as shown in FIG. 5, a square, buttress or similarly formed thread configuration 55 is used in its engagement of the non-rotatable stem 6. It should be appreciated that in all other respects the construction follows that employed in connection with FIGS. 5 and 6, but explanation is made that the use of square thread or the like at 55 allows for a desirable clearance to be employed between the outside of the threads 55 and the valve chamber 48 to provide the annular clearance at 56. Such construction thereby permits of any desired transverse movement in connection with the adjustment of the flexible gate 44 to the valve seat in the course of service without interfering with the flexibility present in the construction of the closure member. Thus, as the member halves 45 and 46 are slightly deflected during such adjustment to coincide with the angularity of the casing seats (not shown), the annular clearance at 56 will permit of such closure member deflection. In further explanation of the benefits arising from said clearance, it should be understood that the flexible wedge disc or closure member must obviously be free to deflect without restriction by the disc stem ring nut 54.

So far in presenting the application of the invention, the description has been confined to the connection between the valve stem and the valve disc or closure member in all cases. It has been discovered that the principle underlying this disc stem connection is capable of further application insofar as valve constructions particularly are concerned. Specifically in referring to FIGS. 9 and 10, the application of the invention is shown to a yoke sleeve within which a threaded valve stem 6 is journalled as illustrated. The same principle is applied here in that a split ring nut or segmented bushing generally designated 57 consists of the split halves 58 and 59 and are threaded on their exterior as at 61 to threadedly engage the hub 62 of the valve yoke or base member generally designated 63. The split halves 58 and 59 on their respective inner portions are provided with the grooves 60 and inner annular projections 50 engaging respective annular projections 64 and grooves 65 of the yoke sleeve generally designated 66. The stem is threadedly received within the yoke sleeve as indicated at 67. The split halves 58 and 59 are mounted over the yoke sleeve 66 and while in the latter position are rotated together and axially moved for assembly on the threads 61 as shown. When the split members 58 and 59 have been assembled in the said position, a suitable annular weld 68 locks the split members 58 and 59 against further relative rotation with respect to the yoke 63.

It will be noted that instead of machining the split ring nut clearance free, the ring nut can be cut in half by a saw cut and the two segments or halves with oppositely disposed faces 71 and 72 can be held apart by suitable inserts in the saw-cut clearance by means of the pins 70. The said pins by virtue of the thickness of the heads 69 define the desired clearance between the portions 59 and 58 as indicated by said surfaces 71 and 72.

A handwheel 74 mounted upon the polygonal taper 73 is held thereon by wheel nut 76 attached to the yoke sleeve by means of the threads 75 on the yoke sleeve 66. It will be understood that upon predetermined rotation of said handwheel the said yoke sleeve is rotated to effect the desired axial movement of the valve stem 6 and the closure member (not shown).

A plurality of embodiments have been shown and described, but it will be appreciated that this has been done only for purpose of illustration of the wide scope of the invention and not for purposes of limitation.

I claim:

1. A valve stem mounting combination comprising: a valve stem having a plurality of annular, concentric projections thereon; an externally threaded, split disc bushing having a plurality of annular projections on its inner portion cooperating with and positioned between said annular projections on said stem; a closure member threadedly received by said bushing; means to prevent relative rotation between said closure member and said bushing upon assemblage of said combination thereby inhibiting axial movement of said stem relative to said closure member and bushing.

2. In a swivelable disc connection for valves, the combination of a closure member and an actuating stem therefor, said stem in assembled position entering a recess within said closure member and having at an inner end portion a plurality of concentric grooves, disc stem ring nut means comprising a plurality of rotatable separable segments have inner concentric grooves enclosing and coinciding with the grooves of said stem to cooperate with the latter member to hold it against relative axial movement, said separable segments on outer portions thereof being threaded, the said closure member recess being defined by threads coinciding with said threads on the outer portions of said segments to permit predetermined axial movement of said segments upon rotation of said segments, and locking means for restraining said segments against rotation relative to the said closure member upon final adjustment of said segments relative to said stem.

3. The subject matter of claim 2, the said closure member comprising oppositely disposed discs with a carrier member therefor, the said carrier member being recessed to receive said segments in threaded engagement therewith.

4. The subject matter of claim 2, the respective concentric grooves of said stem and segments providing for radial clearances therebetween to permit slight transverse movement between said closure member and said stem.

5. In a connection between a valve stem and a flexible wedge gate closure member, the latter member having disc halves and tie means therebetween with a threaded recess in proximity to said tie means, the said threaded recess being located above said tie means; disc stem nut means in said recess having a plurality of segments concentrically grooved on their inside portions and threaded on outer portions thereof, the latter threaded portions engaging said threaded recess to hold the said stem against substantial axial movement relative to said closure member; the said threaded recess providing for predetermined annular clearance between the threads of said recess and the threads of said segments whereby to allow for limited transverse movement of the disc halves adjacent said recess and relative to said stem.

6. In a connection between a valve stem and a flexible wedge gate closure member, the latter member having disk halves and tie means therebetween with a threaded recess in proximity to the said tie means, disc stem nut means in said recess having a plurality of segments concentrically grooved on their inside portions and threaded on outer portions thereof, the latter threaded portions engaging said threaded recess to hold the said stem against substantial axial movement relative to said closure member; the said stem and closure member having means therebetween to prevent substantial rotational movement of the said stem relative to said closure member.

7. A valve stem mounting for a rising, non-rotatable stem including: a valve yoke, a split bushing threadedly engaged in said yoke, said bushing having an internal bore including a plurality of concentric projections thereon; a yoke sleeve having a plurality of annular projections on its outer portion cooperating with and positioned for rotational movement in said bushing, said yoke sleeve having an internal threaded portion; a valve a stem threadedly engaged in said threaded portion of said yoke sleeve; and, a handwheel secured to said yoke sleeve adapted to rotate said sleeve to thereby effect axial movement of said stem.

8. The subject matter of claim 1 and further including means to maintain said bushings in spaced-apart relationship.

9. The subject matter of claim 7 wherein said means include a pair of headed pins positioned between said bushings, the thickness of said heads defining the minimum space between said bushings.

10. In means for journalling a valve stem in another threaded valve member, the said means including means for inhibiting substantial stem movement in axial directions, the latter means comprising a segmental bushing consisting of a plurality of annular segments mounted in substantially the same plane in the recess of said other valve member, the said segments having outer screw threaded portions for engagement of the threads in the other valve member and having inner annular grooves oppositely disposed cooperating with the stem to inhibit said stem axial movement.

References Cited by the Examiner

UNITED STATES PATENTS

| | | | |
|---|---|---|---|
| 904,210 | 11/1908 | Minard | 287—113 |
| 925,880 | 6/1909 | Doolittle | 251—357 X |
| 1,021,271 | 3/1912 | Sharp | 287—91 X |
| 1,792,945 | 2/1931 | Van Deventer | 251—88 |
| 2,519,460 | 8/1950 | Hansen | 287—91 X |

FOREIGN PATENTS

| | | |
|---|---|---|
| 1,130,592 | 2/1957 | France. |

M. CARY NELSON, *Primary Examiner.*

R. C. MILLER, *Assistant Examiner.*